United States Patent
Shivalinga et al.

(10) Patent No.: US 11,365,005 B2
(45) Date of Patent: Jun. 21, 2022

(54) CASTER ASSEMBLY FOR CARGO HANDLING SYSTEM

(71) Applicant: GOODRICH CORPORATION, Charlotte, NC (US)

(72) Inventors: Vinodkumar Shivalinga, Bangalore (IN); Mohinder Saini, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/128,071

(22) Filed: Dec. 19, 2020

(65) Prior Publication Data

US 2021/0269155 A1    Sep. 2, 2021

(30) Foreign Application Priority Data

Feb. 28, 2020 (IN) .............................. 202041008627

(51) Int. Cl.
*B64D 9/00* (2006.01)
*B65G 13/11* (2006.01)

(52) U.S. Cl.
CPC ............... *B64D 9/00* (2013.01); *B65G 13/11* (2013.01); *B64D 2009/006* (2013.01)

(58) Field of Classification Search
CPC .... B64D 9/00; B64D 2009/006; B65G 13/11; B64F 2009/006

USPC ............................................. 193/37; 198/306
See application file for complete search history.

(56) References Cited

U.S. PATENT DOCUMENTS

| | | | |
|---|---|---|---|
| 5,097,565 A | 3/1992 | Shorey | |
| 5,533,604 A * | 7/1996 | Brierton | B65G 39/025 193/35 MD |
| 6,223,388 B1 | 5/2001 | Sey | |
| 6,604,258 B2 * | 8/2003 | Saggio | B60B 33/0068 16/48 |
| 8,109,702 B2 * | 2/2012 | Stegmiller | B64D 9/00 410/92 |
| 8,387,919 B2 * | 3/2013 | Huber | B65G 13/075 244/137.1 |
| 10,850,843 B2 * | 12/2020 | Dallum | F16C 17/04 |
| 2010/0054889 A1 * | 3/2010 | Stegmiller | B64D 9/00 410/92 |
| 2019/0009164 A1 | 1/2019 | Russell-Uren | |
| 2019/0337622 A1 * | 11/2019 | Dallum | B65G 13/11 |

* cited by examiner

*Primary Examiner* — Gene O Crawford
*Assistant Examiner* — Lester Rushin, III
(74) *Attorney, Agent, or Firm* — Snell & Wilmer LLP

(57) ABSTRACT

A caster roller assembly may comprise a base, a roller rotationally coupled to the base, and a thrust bearing assembly adjacent to an underside surface of the base. The thrust bearing assembly may include a bearing cup, a plurality of thrust rollers located in a channel defined by the bearing cup, and a top plate located between plurality of thrust rollers and the base. An inner circumferential surface of the top plate may define an opening configured to receive a protrusion extending from the underside surface of the base.

20 Claims, 10 Drawing Sheets

CASTER ASSEMBLY FOR CARGO HANDLING SYSTEM

CROSS-REFERENCE TO RELATED APPLICATIONS

This application claims priority to, and the benefit of, India Patent Application No. 202041008627, filed Feb. 28, 2020 and titled "CASTER ASSEMBLY FOR CARGO HANDLING SYSTEM," which is incorporated by reference herein in its entirety for all purposes.

FIELD

The present disclosure relates generally to cargo handling systems and, more particularly, to caster assemblies for cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo handling system to forward or aft locations, depending upon the configuration of the aircraft. Cargo handling systems, such as, for example, those used on aircraft for transport of heavy containerized cargo or pallets, also referred to herein as unit load devices (ULDs), typically include roller trays containing transport rollers that support and transport the containerized cargo or pallets. Motor driven rollers are typically employed in these systems. In certain aircraft, a plurality of motor driven power drive units (PDUs) is used to propel the containers or pallets within the cargo compartment. This configuration facilitates transportation of the containers or pallets within the cargo compartment by one or more operators or agent-based systems controlling operation of the PDUs.

Maneuvering a ULD in the doorway of the cargo deck may include multi directional conveyance of the ULD, as the ULD may be loaded laterally into the cargo compartment and then translated longitudinally (i.e., fore and aft). Caster roller assemblies and ball panels may be located in the doorway to facilitate this multi directional movement. Current caster roller assemblies generally include a roller which is secured to and rotates relative to a base of the caster roller assembly. The assembly further includes a thrust bearing, which allows the base to swivel and align in the direction of ULD travel. A nut and bolt fastener is generally employed to secure the base either directly to the ball panel or to a cup located within an opening in the ball panel. At least a portion of the fastener (e.g., the nut or the head of the bolt) may be located on the underside of the ball panel (i.e., on the side opposite the conveyance plane). Thus, to remove the caster roller assembly, the ball panel is removed to access the fastener. Removal of ball panels tends to increase maintenance cost and time. Further, current caster roller assemblies generally include a spherical bearing located between the fastener and the base to allow for misalignment between a pivot axis of the base and the axis of the bolt due to eccentric loads on the base, thus increasing the part count and installation difficulty.

SUMMARY

A caster roller assembly is disclosed herein. In accordance with various embodiments, the caster roller assembly may comprise a base, a roller rotationally coupled to the base, and a thrust bearing assembly adjacent to an underside surface of the base. The thrust bearing assembly may include a bearing cup, a plurality of thrust rollers located in a channel defined by the bearing cup, and a top plate located between the plurality of thrust rollers and the base. An inner circumferential surface of the top plate may define an opening configured to receive a protrusion extending from the underside surface of the base.

In various embodiments, an outer diameter of the top plate may be less than an outer diameter of the bearing cup. In various embodiments, an axis of rotation of a first thrust roller of the plurality of thrust rollers may be oriented at a non-parallel angle relative to an axis of rotation of the roller. In various embodiments, an outer circumferential surface of the first thrust roller of the plurality of thrust rollers may be non-parallel to the axis of rotation of the first thrust roller.

In various embodiments, the plurality of thrust rollers may include a plurality of vertical thrust rollers and a plurality of horizontal thrust rollers. An axis of rotation of each vertical thrust roller of the plurality of vertical thrust rollers may be perpendicular to an axis of rotation of the roller. An axis of rotation of each horizontal thrust roller of the plurality of horizontal thrust rollers may be parallel to the axis of rotation of the roller.

In various embodiments, the caster roller assembly may further comprise a housing configured to receive the thrust bearing assembly and the base. In various embodiments, a spring-loaded clip may extend from an outer circumferential surface of the housing. A receptacle may be configured to receive the housing. The receptacle may define a clip groove configured to receive the spring-loaded clip.

A ball panel is also disclosed herein. In accordance with various embodiments, the ball panel may comprise a plurality of roller balls and a caster roller assembly located in an opening defined by the ball panel. The caster roller assembly may comprise a base, a roller rotationally coupled to the base, and a thrust bearing assembly located between the base and a floor of the opening. The thrust bearing assembly may include a bearing cup, a plurality of thrust rollers located in a channel defined by the bearing cup, and a top plate located between the plurality of thrust rollers and the base. An inner circumferential surface of the top plate may define an opening configured to receive a protrusion extending from an underside surface of the base.

In various embodiments, an outer diameter of the top plate may be less than an outer diameter of the bearing cup. In various embodiments, a plate protrusion extending from the top plate may be located in the channel defined by the bearing cup.

In various embodiments, an axis of rotation of each thrust roller of the plurality of thrust rollers may be oriented at a non-parallel angle relative to an axis of rotation of the roller.

In various embodiments, the plurality of thrust rollers may include a plurality of vertical thrust rollers and a plurality of horizontal thrust rollers. An axis of rotation of each vertical thrust roller of the plurality of vertical thrust rollers may be perpendicular to an axis of rotation of the roller. An axis of rotation of each horizontal thrust roller of the plurality of horizontal thrust rollers may be parallel to the axis of rotation of the roller.

In various embodiments, the caster roller assembly may further comprise a housing configured to receive the thrust bearing assembly and the base, a circlip located within a groove defined by the housing, and a spring-loaded clip extending from an outer circumferential surface of the housing.

In various embodiments, a receptacle may be located within the opening in the ball panel. The receptacle may be located between the outer circumferential surface of the housing and a sidewall of the opening in the ball panel. In various embodiments, the receptacle may define a clip groove configured to receive the spring-loaded clip. In various embodiments, the receptacle may include a clip-flange configured to secure the receptacle to the ball panel.

A cargo handling system is also disclosed herein. In accordance with various embodiments, the cargo handling system may comprise a ball panel and a caster roller assembly coupled to the ball panel. The caster roller assembly may comprise a base, a roller rotationally coupled to the base, and a thrust bearing assembly adjacent to an underside surface of the base. The thrust bearing assembly may include a top plate, a plurality of thrust rollers, and a bearing cup.

In various embodiments, an outer diameter of the top plate may be less than an outer diameter of the bearing cup. In various embodiments, a protrusion extending from the underside surface of the base may contact an inner circumferential surface of the top plate. In various embodiments, an axis of rotation of each thrust roller of the plurality of thrust rollers may be oriented at a non-parallel angle relative to an axis of rotation of the roller.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
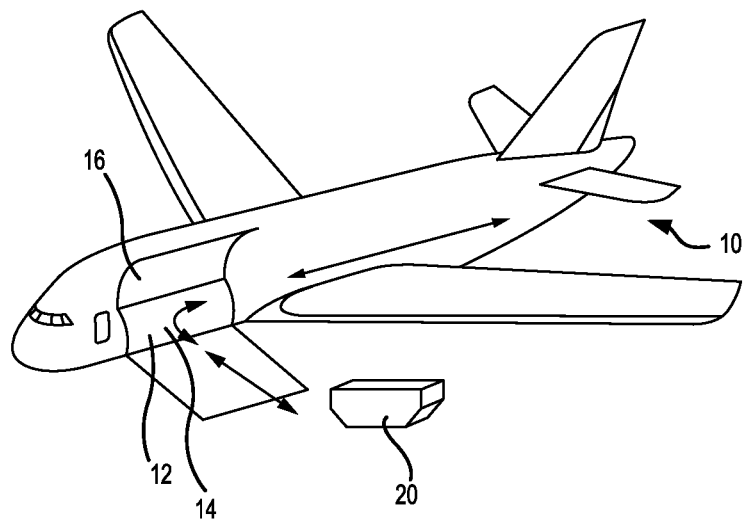
FIG. 1A illustrates an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. Aircraft 10 may comprise a cargo load door 16 located, for example, at one side of a fuselage structure of aircraft 10. A unit load device (ULD) 20, in the form of a container or pallet, for example, may be loaded through cargo load door 16 and onto cargo deck 12 of aircraft 10 or, conversely, unloaded from cargo deck 12 of aircraft 10. In general, ULDs are available in various sizes and capacities, and are typically standardized in dimension and shape. Once loaded with items destined for shipment, ULD 20 is transferred to aircraft 10 and then loaded onto aircraft 10 through cargo load door 16 using a conveyor ramp, scissor lift, or the like. Once inside aircraft 10, ULD 20 is moved within cargo compartment 14 to a final stowed position. Multiple ULDs may be brought on-board aircraft 10, with each ULD 20 being placed in a respective stowed position on cargo deck 12. After aircraft 10 has reached its destination, each ULD 20 is unloaded from aircraft 10 in similar fashion, generally in reverse sequence to the loading procedure. To facilitate movement of ULD 20 along cargo deck 12, the aircraft 10 may include a cargo handling system as described herein in accordance with various embodiments.

Figure 1B:
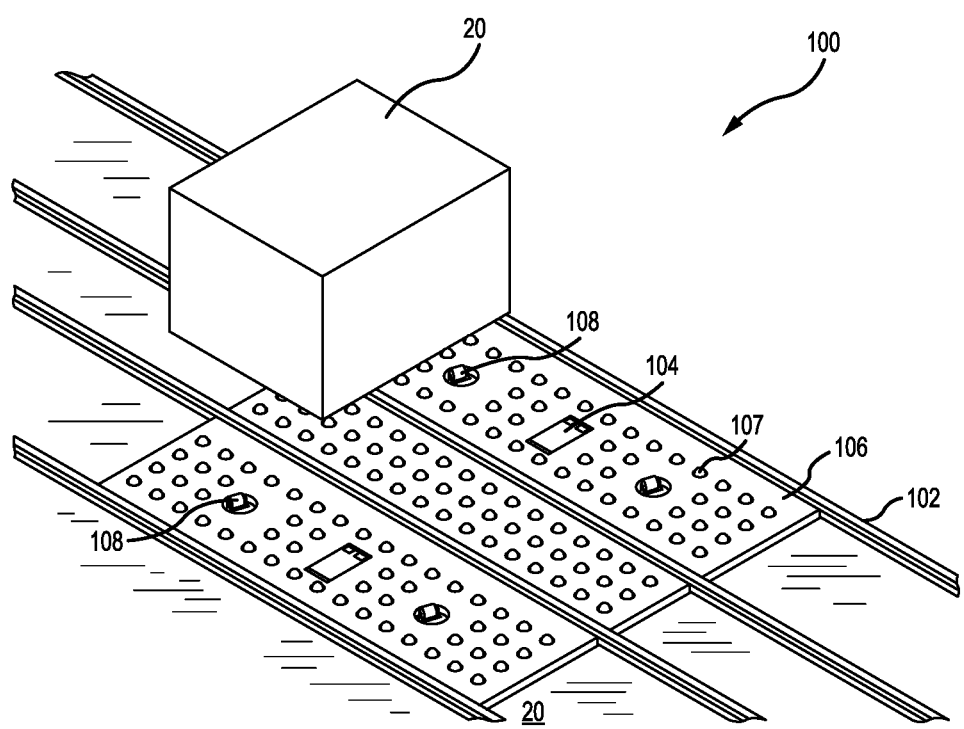
FIG. 1B illustrates a portion of a cargo handling system, in accordance with various embodiments.

Referring now to FIG. 1B, a portion of a cargo handling system 100 for the aircraft 10 in FIG. 1A is illustrated, in accordance with various embodiments. In various embodiments, cargo handling system 100 may include a plurality of roller trays 102 supported by cargo deck 12. Roller trays 102 may be configured to support and convey ULD 20 longitudinally (i.e., fore and aft) along cargo deck 12. In various embodiments, cargo handling system 100 may further include one or more ball panels 106. Ball panels 106 may be located proximate cargo load door 16, with momentary reference to FIG. 1A, or any other location where multi directional motion of ULD 20 is desired. A plurality of power drive units 104 may be located along cargo deck 12 (e.g., in ball panels 106 and/or in roller trays 102) to propel ULD 20 along cargo deck 12.

Ball panels 106 each include a plurality of roller balls 107 located therein. Roller balls 107 are configured for multi directional rotation. In accordance with various embodiments, one or more caster roller assemblies 108 may be coupled to ball panels 106. Stated differently, one or more of ball panels 106 may include a caster roller assembly 108. As described in further detail below, caster roller assembly 108 may be configured to swivel (or rotate) relative to ball panel 106, thereby by allowing caster roller assembly 108 to align with the direction of movement of ULD 20 over ball panel 106.

Referring now to FIGS. 2A, 2B, 2C, and 2D caster roller assembly 108, is illustrated in exploded and assembled forms. In accordance with various embodiments, the caster roller assembly 108 includes a base assembly 110, a thrust bearing assembly 112, and a circlip 116 configured to secure the caster roller assembly within ball panel 106. In accordance with various embodiments, base assembly 110 includes a base 120 and a roller 122 configured to rotate relative to the base. Base assembly 110 may further include a pair of bearings 124, a roller pin 126, and a clip 128. Roller 122 is rotationally coupled to base 120 via roller pin 126. Clip 128 secures roller pin 126 to base 120. Clip 128 may include a circlip or any other suitable fastener. Roller 122 may rotate about roller pin 126. In various embodiments, roller pin 126 may be configured to prevent, or reduce, rotation of roller pin 126 relative to base 120. For example, in various embodiments, a head 127 of roller pin 126 may in include a flat, or generally non-curved, surface 127a. Surface 127a may contact an underside surface 121 of base 120. The contact between surface 127a and underside surface 121 tends to block or prevent rotation of roller pin 126. In various embodiments, roller pin 126 may define a clip groove 129 configured to receive clip 128. The location of clip groove 129 is selected such that locating clip 128 in clip groove 129 prevents, or reduces, axial translation of roller pin 126 (i.e., translation in a direction parallel to the axis of rotation R of roller 122).

In accordance with various embodiments, thrust bearing assembly 112 includes a bearing cup 130, a top plate 132, and a tapered roller cage 134. Bearing cup 130 defines a channel 136 configured to receive tapered roller cage 134. In the assembled stated, top plate 132 is located on bearing cup 130, over tapered roller cage 134, such that top plate 132 is adjacent to and/or contacting underside surface 121 of base 120. Thrust bearing assembly 112 enables base 120 to rotate three-hundred sixty degrees (360°) with respect to bearing cup 130 and ball panel 106.

Caster roller assembly 108 is configured to mount within an opening 140 defined by ball panel 106. A circumferential groove 142 may be formed in the sidewall 144 defining opening 140. Sidewall 144 may extend from a floor 146 of opening 140 to surface 148 of ball panel 106. Circumferential groove 142 is configured to receive circlip 116, with base assembly 110 and thrust bearing assembly 112 located between circlip 116 and a floor 146 of opening 140. Locating circlip 116 in circumferential groove 142 secures caster roller assembly 108 to ball panel 106.

Figure 2A:
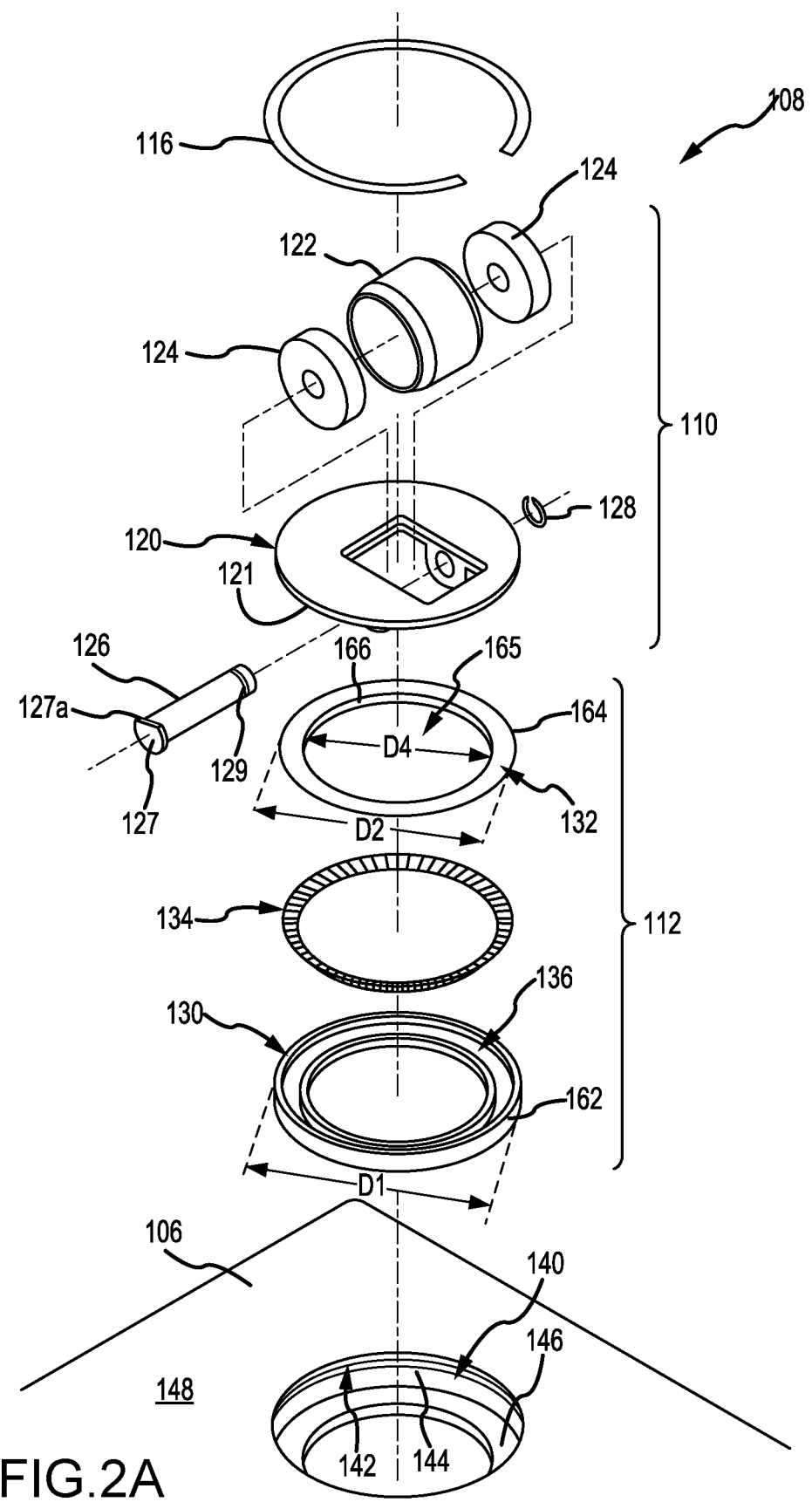
FIG. 2A illustrates an exploded view of a caster roller assembly, in accordance with various embodiments.
Figures 2B, 2C:
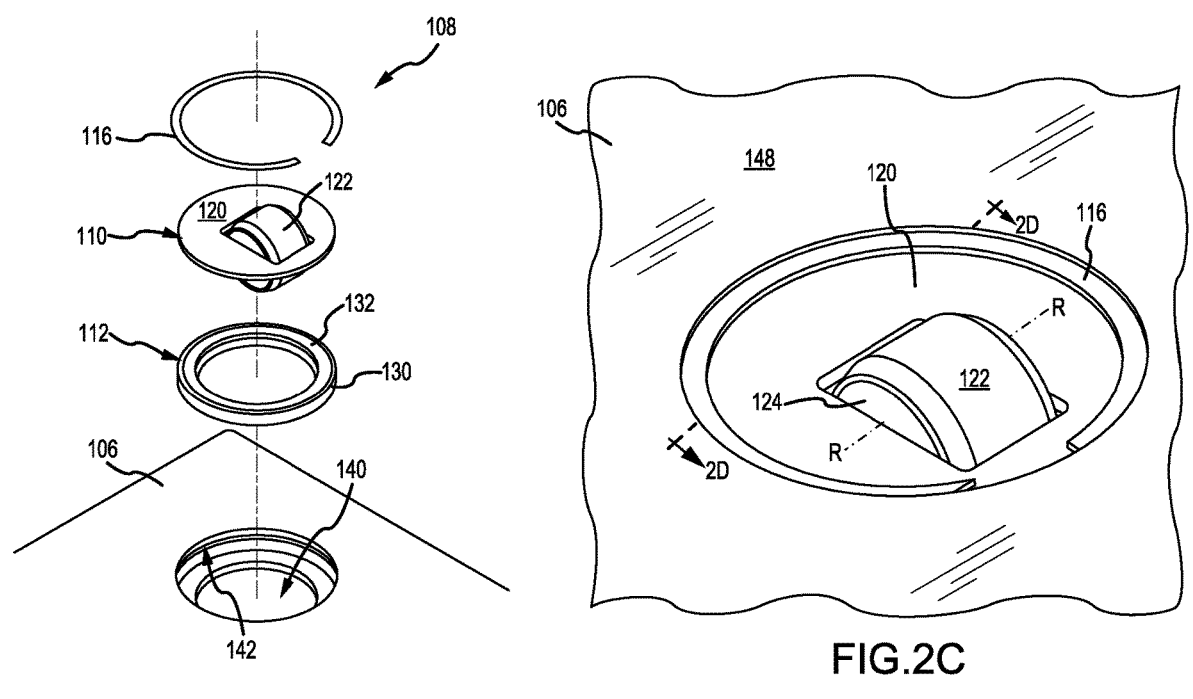
FIG. 2B illustrates a partially assembled view of a caster roller assembly, in accordance with various embodiments.
FIG. 2C illustrates an assembled view of a caster roller assembly, in accordance with various embodiments.
Figure 2D:
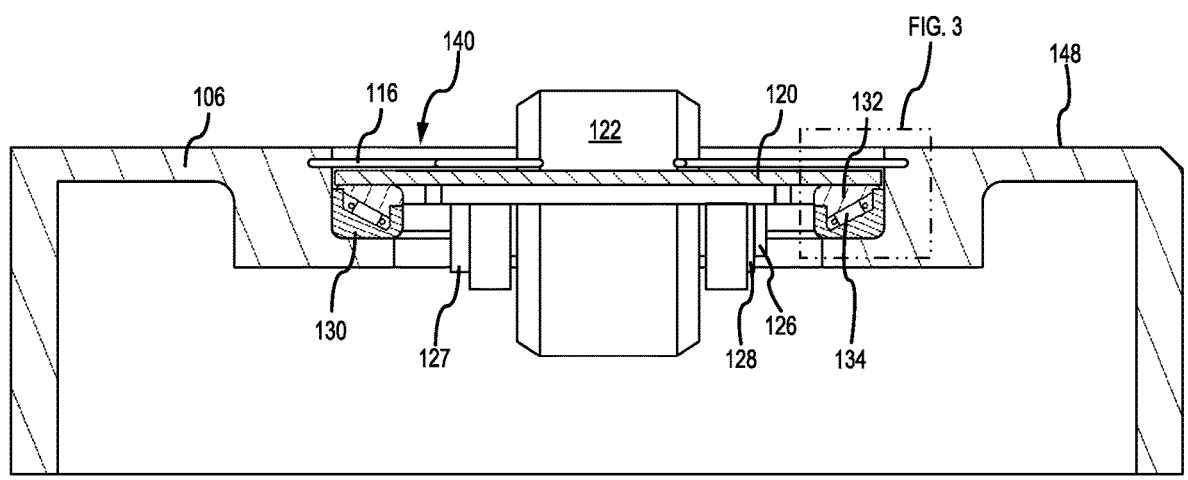
FIG. 2D illustrates a cross-section view of the assembled caster roller assembly of FIG. 2C taken along the line 2D-2D in FIG. 2C, in accordance with various embodiments.
Figure 3:
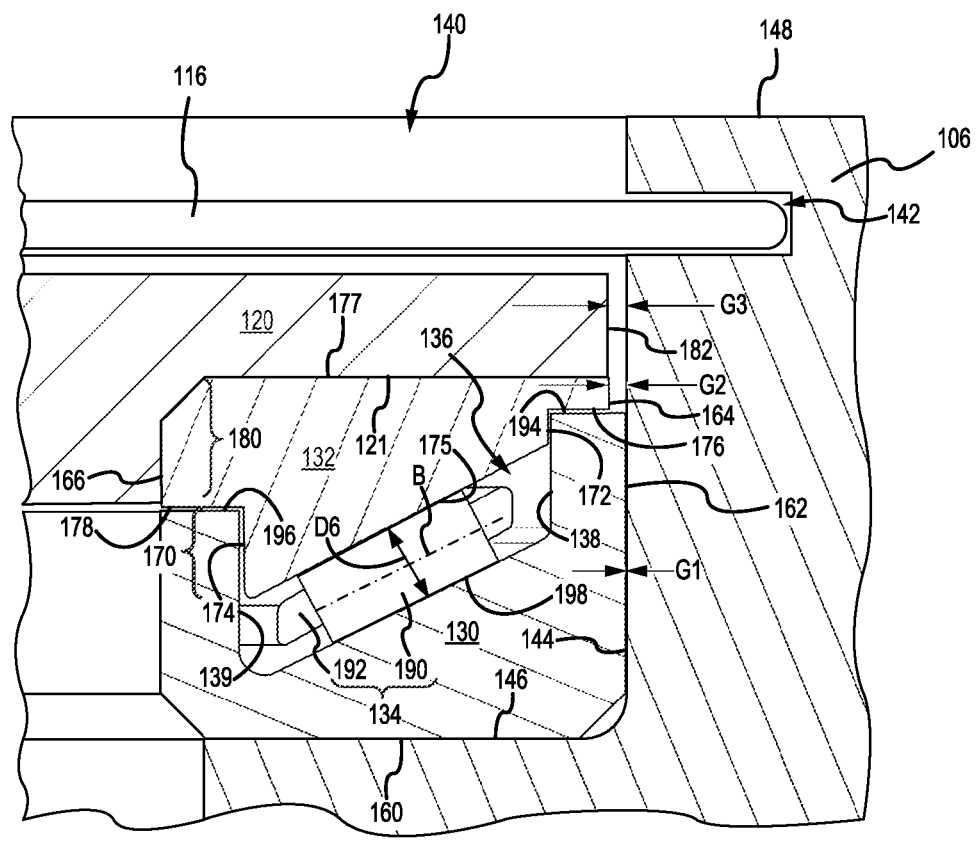
FIG. 3 illustrates a portion of the caster roller assembly located in the box labeled FIG. 3 in FIG. 2D, in accordance with various embodiments.

Referring to FIG. 3, additional details of assembled caster roller assembly 108 located within opening 140 of ball panel 106 are illustrated. In accordance with various embodiments, an underside surface 160 of bearing cup 130 is located on floor 146 of opening 140. An outer diameter D1, with momentary reference to FIG. 2A, of bearing cup 130 is selected to minimize a gap G1 between outer circumferential surface 162 of bearing cup 130 and sidewall 144 of opening 140. In various embodiments, outer circumferential surface 162 of bearing cup 130 may be in contact with sidewall 144. An outer diameter D2, with momentary reference to FIG. 2A, of top plate 132 may be less than outer diameter D1 of bearing cup 130. In this regard, a gap G2 between outer circumferential surface 164 of top plate 132 and sidewall 144 of opening 140 is greater than the gap G1 between outer circumferential surface 162 of bearing cup 130 and sidewall 144 of opening 140.

Top plate 132 includes a protrusion 170 (also referred to as a plate protrusion) configured to extend into channel 136 of bearing cup 130. Plate protrusion 170 may be defined by an outer radial surface 172, an inner radial surface 174, and a roller interface surface 175. Outer radial surface 172 may extend from an outer underside surface 176 of top plate 132 in a direction opposite an upper surface 177 of top plate 132. Outer underside surface 176 may be generally parallel to underside surface 121 of base 120 and/or generally parallel to surface 148 of ball panel 106. Inner radial surface 174 may extend from an inner underside surface 178 of top plate 132 in a direction opposite upper surface 177 of top plate 132. Inner underside surface 178 may be generally parallel to underside surface 121 of base 120 and/or generally parallel to surface 148 of ball panel 106. Outer underside surface 176 and inner underside surface 178 are oriented away from upper surface 177 of top plate 132. In accordance with various embodiments, roller interface surface 175 extends from outer radial surface 172 to inner radial surface 174.

Figure 4:
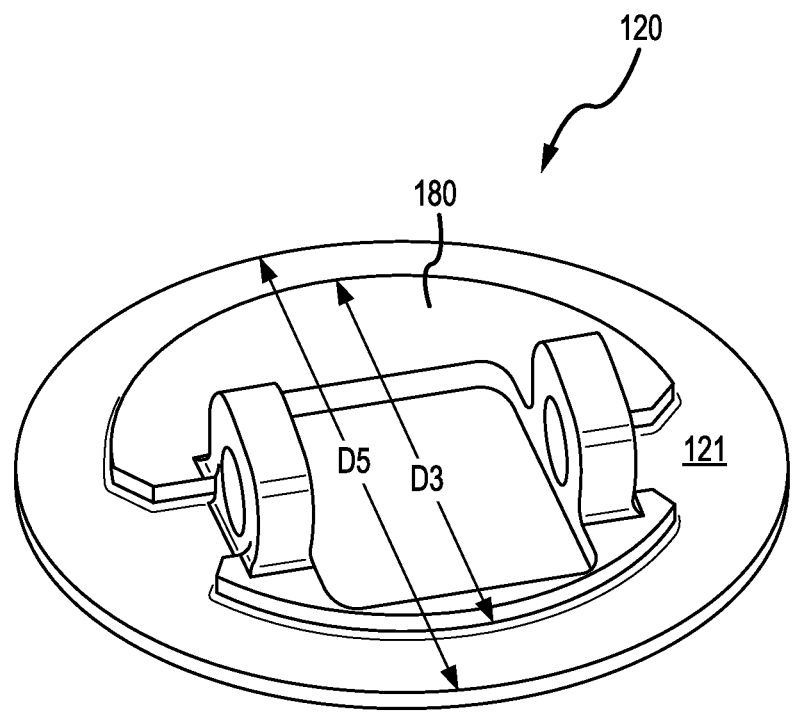
FIG. 4 illustrates a perspective view of the underside of a base of a caster roller assembly, in accordance with various embodiments.

With reference to FIG. 4, and continued reference to FIG. 2A, base 120 includes a protrusion 180 extending from underside surface 121. A diameter D3 of protrusion 180 is selected such that protrusion 180 may be located within an opening 165 (FIG. 2A) defined by inner circumferential surface 166 of top plate 132. Stated differently, an inner diameter D4 of top plate 132 is selected such that top plate 132 receives protrusion 180 of base 120. In the assembled stated, protrusion 180 contacts inner circumferential surface 166 of top plate 132. In various embodiments, diameter D3 of protrusion 180 and inner diameter D4 of top plate 132 are selected such that protrusion 180 is press fit into top plate 132. Stated differently, base 120 may be frictionally coupled to top plate 132. The coupling between top plate 132 and base 120 tends to allow top plate 132 and base 120 to rotate together, as integrated parts, relative to bearing cup 130.

An outer diameter D5 of base 120 may be less than outer diameter D1 of bearing cup 130. In this regard, and with reference to FIG. 3, a gap G3 between outer circumferential surface 182 of base 120 and sidewall 144 of opening 140 is greater than the gap G1 between outer circumferential surface 162 of bearing cup 130 and sidewall 144. In various embodiments, gap G3 may be equal to gap G2. The interference between protrusion 180 and top plate 132 tends to reduce or prevent base 120 from translating horizontally. As used in the previous context, "horizontally" refers to directions parallel to surface 148 of ball panel 106 and/or parallel to the axis of rotation R of roller 122. In accordance with various embodiments, locating protrusion 180 in top plate 132 tends to reduce translation of base 120 toward and away from sidewall 144, thereby maintaining gap G3.

With continuing reference to FIG. 3, in accordance with various embodiments, tapered roller cage 134 includes a plurality of thrust rollers 190 rotationally coupled to a plate 192. Thrust rollers 190 are oriented such that the axis of rotation B of each thrust roller 190 is non-horizontal (i.e., non-parallel to surface 148 of ball panel 106 and/or non-parallel to the axis of rotation R of roller 122). For example, the axis of rotation B of thrust rollers 190 may be oriented at an angle between 10° and 80°, between 30° and 60°, or of about 45° relative to the axis of rotation R of roller 122. As used in the previous context only, the term "about" means±5°.

Plate protrusion 170 is configured such that, when thrust bearing assembly 112 is in the assembled state, roller interface surface 175 contacts thrust rollers 190. In accordance with various embodiments, when thrust bearing assembly 112 is in the assembled state, outer radial surface 172 of plate protrusion 170 is spaced apart from (i.e., is not in contact with or is in minimal contact with) an outer sidewall 138 of channel 136 in bearing cup 130, inner radial surface 174 of plate protrusion 170 is spaced apart from an inner sidewall 139 of channel 136, outer underside surface 176 of top plate 132 is spaced apart from an outer upper surface 194 of bearing cup 130, and inner underside surface 178 of top plate 132 is spaced apart from an inner upper surface 196 of bearing cup 130.

Each thrust roller 190 includes a diameter D6. In various embodiments, thrust rollers 190 may be cylindrical and have a constant diameter D6 along the axial length of the thrust roller 190. Stated differently, in various embodiments, the outer circumferential surface 198 of thrust roller 190 may be parallel to axis of rotation B. In various embodiments, thrust rollers 190 may be tapered such that the diameter D6 of each thrust roller 190 varies along the axial length of the thrust roller 190. For example, in various embodiments, diameter D6 may increase in a direction extending from inner sidewall 139 toward outer sidewall 138 of channel 136. Stated differently, in various embodiments, outer circumferential surface 198 of thrust roller 190 may be non-parallel to axis of rotation B.

Plate protrusion 170 is configured such that the angle of roller interface surface 175 relative to axis of rotation B of thrust roller 190 is approximately equal to the angle of the outer circumferential surface 198 of thrust roller 190 relative to the axis of rotation B. As used in the previous context, the term "approximately equal" means±5°. The angle of roller interface surface 175 relative to axis of rotation B and the angle of outer circumferential surface 198 relative to axis of rotation B are selected to reduce horizontal translation of top plate 132 and/or base 120 (i.e., translation toward sidewall 144), thereby maintaining gap G2 and gap G3, respectively.

Employing angled (i.e., non-horizontal) thrust rollers 190 tends to allow both radial loads and thrust loads generated by conveyance of a ULD by roller 122 to be transferred through thrust rollers 190 and bearing cup 130 of thrust bearing assembly 112 to ball panel 106. For example, the angle of thrust rollers 190, the spacing between outer underside surface 176 of top plate 132 and outer upper surface 194 of bearing cup 130, and the spacing between inner underside surface 178 of top plate 132 and inner upper surface 196 of bearing cup 130 tend to allow the entire, or nearly the entire, radial load from roller 122 to be transferred from base 120 to bearing cup 130 via the interface between roller interface surface 175 of top plate 132 and thrust rollers 190; while the angle of thrust rollers 190, the spacing between outer radial surface 172 of plate protrusion 170 and outer sidewall 138 of channel 136, and the spacing between inner radial surface 174 of plate protrusion 170 and inner sidewall 139 of channel 136, tends to allow the entire, or nearly the entire, thrust load from roller 122 to be transferred from base 120 to bearing cup 130 via the interface between roller interface surface 175 of top plate 132 and thrust rollers 190. Transferring the loads through thrust bearing assembly 112 eliminates the need for fasteners (e.g., nut and bolts) attaching the caster roller assembly to ball panel 106. Eliminating fasteners from caster roller assembly 108 tends to reduce the number of parts associated with caster roller assembly 108 and may decrease installation difficulty and/or maintenance time and costs.

Figure 5:
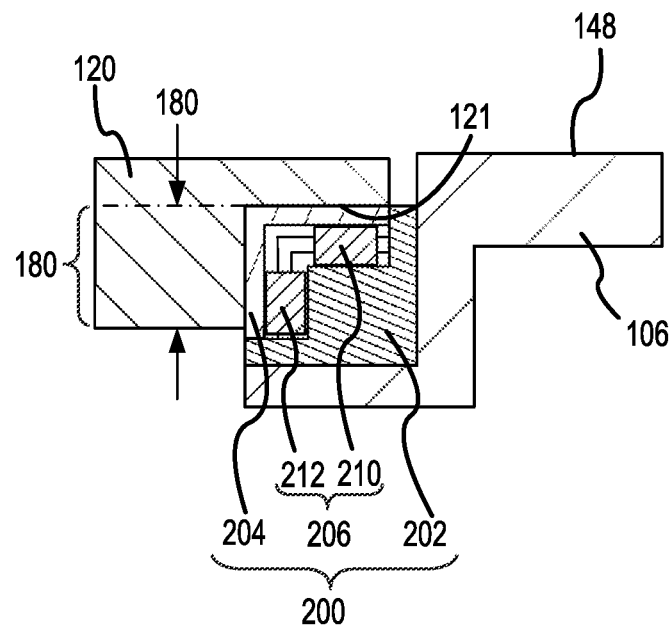
FIG. 5 illustrates a caster roller assembly having a dual roller bearing; in accordance with various embodiments.
Figure 6A:
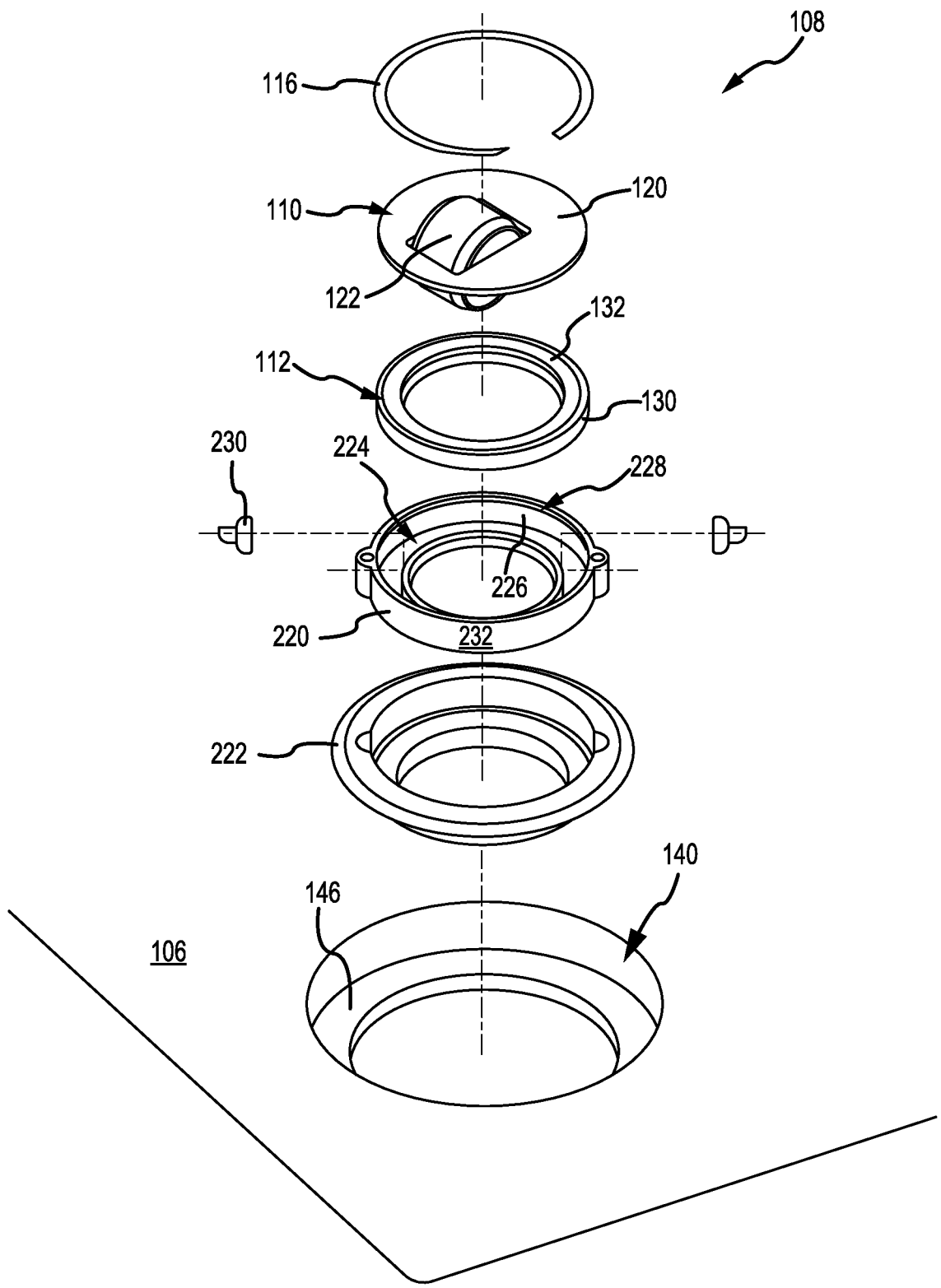
FIGS. 6A, 6B, 6C, and 6D illustrate a caster roller assembly for a cargo handling system, in accordance with various embodiments.
Figure 6B:
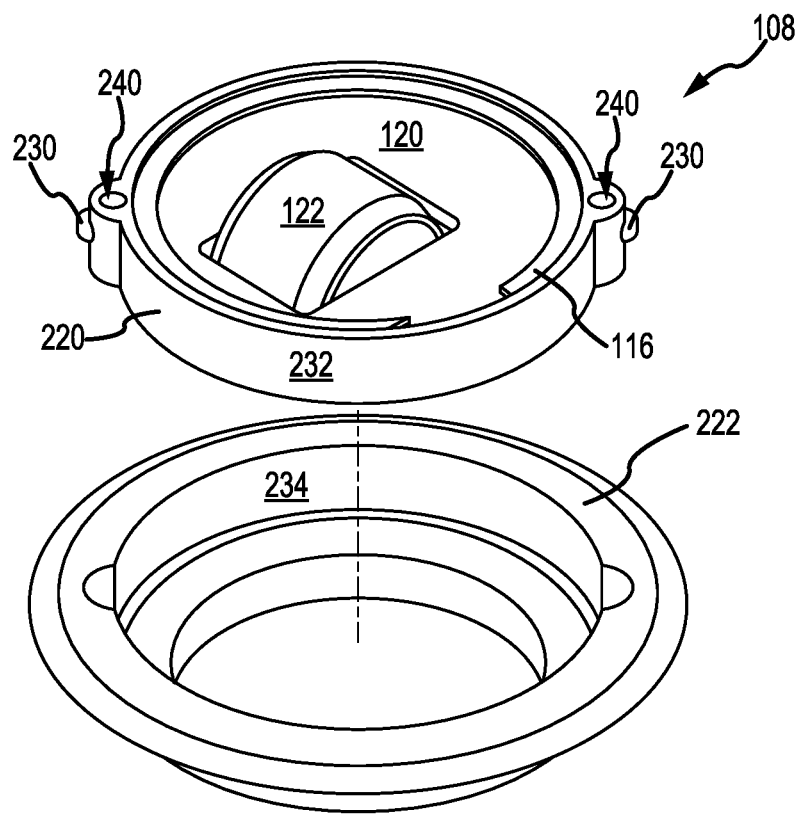
Figure 6C:
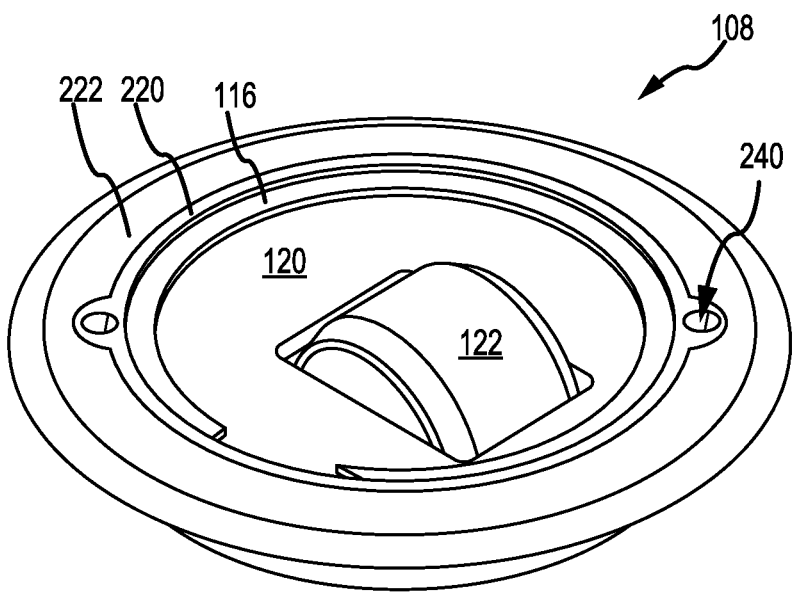
Figure 6D:
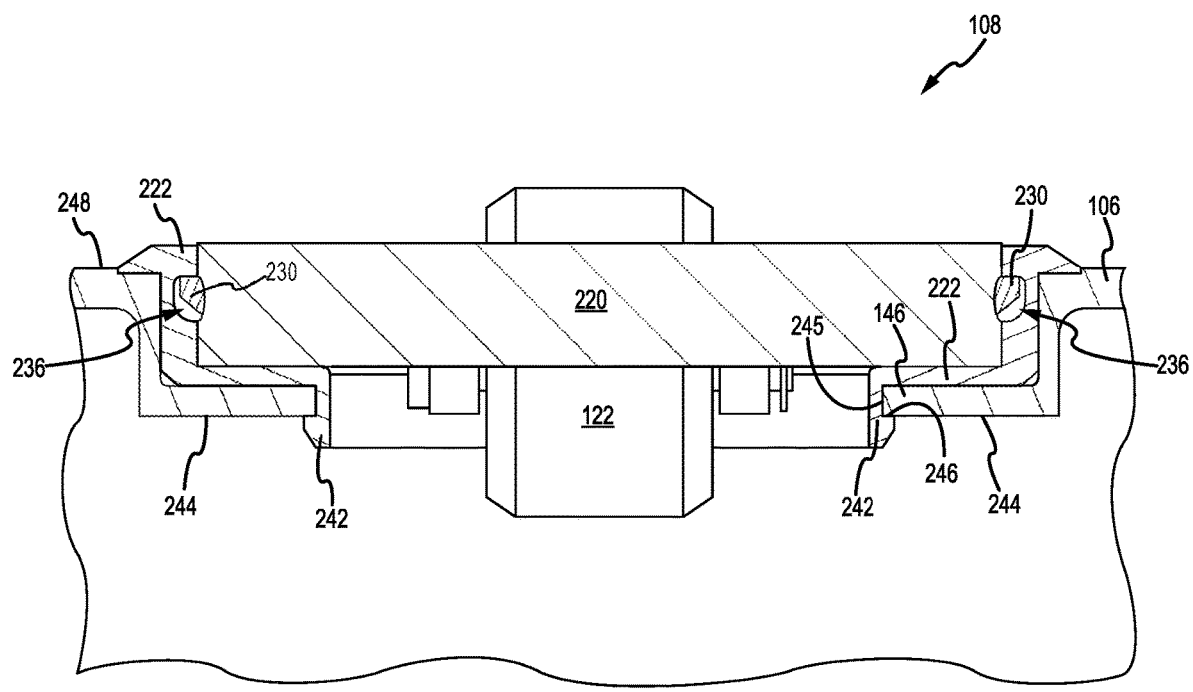

With reference to FIG. 5, in various embodiments, caster roller assembly 108 may include a dual roller bearing assembly 200 in place of thrust bearing assembly 112. Dual roller bearing assembly 200 includes a bearing cup 202, a top plate 204, and a dual roller cage 206. Bearing cup 202 may contact floor 146 and sidewall 144 of opening 140, similar to bearing cup 130 in FIG. 3. Top plate 204 may define a circular opening configured to receive and/or form a friction coupling with protrusion 180 of base 120.

Dual roller cage 206 includes a plurality of horizontal thrust rollers 210 and a plurality of vertical thrust rollers 212. The axis of rotation of horizontal thrust rollers 210 may be generally parallel to surface 148 of ball panel 106 and/or generally parallel to the axis of rotation R (FIG. 2C) of roller 122. As used in the previous context only, "generally parallel" means±5° from parallel. The axis of rotation of vertical thrust rollers 212 may be generally perpendicular to surface 148 of ball panel 106 and/or generally perpendicular to the axis of rotation R (FIG. 2C) of roller 122. As used in the previous context only, "generally perpendicular" means±5° from perpendicular.

Interference between protrusion 180 and top plate 204 and between top plate 204 and vertical thrust rollers 212 may prevent or reduce horizontal translation of base 120 and top plate 204. Reducing horizontal translation may maintain a gap between base 120 and sidewall 144 and/or a gap between top plate 204 and sidewall 144, such that the thrust load path to ball panel 106 is through vertical thrust rollers 212 and bearing cup 202.

Dual roller bearing assembly 200 allows both radial and thrust loads generate by conveyance of ULDs over roller 122 to be transferred through bearing cup 202 to ball panel 106. In this regard, radial loads from roller 122 are transferred from base 120 and top plate 204 to bearing cup 202 via the interface between top plate 204 and horizontal thrust rollers 210, and thrust loads from roller 122 are transferred from base 120 to bearing cup 202 via the interface between top plate 204 and vertical thrust rollers 212. Transferring the loads through dual roller bearing assembly 200 may eliminate the need for fasteners (e.g., nut and bolts) attaching the caster roller assembly to ball panel 106. Eliminating fasteners from caster roller assembly 108 tends to reduce the number of parts associated with caster roller assembly 108 and may decrease installation difficulty and/or maintenance time and costs.

Referring now to FIGS. 6A, 6B, 6C, and 6D, in various embodiments, caster roller assembly 108 may include a housing 220 and receptacle 222. Housing 220 defines a housing channel 224 configured to receive thrust bearing assembly 112 (or dual roller bearing assembly 200 in FIG. 5), base assembly 110, and circlip 116. A sidewall 226 of housing channel 224 may define a circumferential groove 228 configured to receive circlip 116.

One or more spring-loaded clips 230 may be attached to housing 220. Spring-loaded clips 230 may be biased away from an outer circumferential surface 232 of housing 220. An inner circumferential surface 234 of receptacle 222 may define clip grooves 236 (FIG. 6D) configured to receive spring-loaded clips 230. Locating spring-loaded clips 230 in clip grooves 236 may generate an interference between spring-loaded clips 230 and receptacle 222 that secures housing 220 within receptacle 222. In various embodiments, housing 220 may define clip access orifices 240. Clip access orifices 240 are configured to allow an operator to access spring-loaded clips 230. Clip access orifices 240 are configured to allow an operator to apply pressure to spring-loaded clips 230 and thereby cause spring-loaded clips 230 to translate into housing 220 (i.e., away from inner circumferential surface 234 of receptacle 222. Translation of spring-loaded clips 230 into housing 220 allows housing 220 and caster roller assembly 108 to be removed from receptacle 222.

In various embodiments, receptacle 222 may include a clip-flange 242 configured to engage floor 146 of opening 140. Clip-flange 242 may include an interference surface 246 configured to form an interference with an underside surface 244 of floor 146. To install receptacle 222 in ball panel 106, receptacle 222 is inserted into opening 140 in ball panel 106, contact between clip-flange 242 and an inner-circumferential surface 245 of floor 146 may cause clip-flange 242 to bend or deflect toward roller 122. Clip-flange 242 then springs back to its original position (i.e., translates away from roller 122) in response to interference surface 246 of clip-flange 242 clearing (i.e., translating past) underside surface 244 of floor 146. In this regard, clip-flange 242 may be configured to secure receptacle 222 within opening 140 in ball panel 106. Receptacle 222 and housing 220 may allow caster roller assembly 108 to be retrofit into ball panels, which may not include a circumferential groove for receiving circlip 116. Housing 220 may allow for easy installation of caster roller assembly 108.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A caster roller assembly, comprising:
a base;
a roller rotationally coupled to the base; and
a thrust bearing assembly adjacent to an underside surface of the base, the thrust bearing assembly including:
a bearing cup;
a plurality of thrust rollers located in a channel defined by the bearing cup; and
a top plate located between the plurality of thrust rollers and the base, wherein an inner circumferential surface of the top plate defines an opening configured to receive a protrusion extending from the underside surface of the base, wherein an outer diameter of the top plate is less than an outer diameter of the bearing cup.

2. The caster roller assembly of claim 1, wherein an axis of rotation of a first thrust roller of the plurality of thrust rollers is oriented at a non-parallel angle relative to an axis of rotation of the roller.

3. The caster roller assembly of claim 2, wherein an outer circumferential surface of the first thrust roller of the plurality of thrust rollers is non-parallel to the axis of rotation of the first thrust roller.

4. The caster roller assembly of claim 1, wherein the plurality of thrust rollers includes a plurality of vertical thrust rollers and a plurality of horizontal thrust rollers, and wherein an axis of rotation of each vertical thrust roller of the plurality of vertical thrust rollers is perpendicular to an axis of rotation of the roller, and wherein an axis of rotation of each horizontal thrust roller of the plurality of horizontal thrust rollers is parallel to the axis of rotation of the roller.

5. The caster roller assembly of claim 1, further comprising a housing configured to receive the thrust bearing assembly and the base.

6. The caster roller assembly of claim 5, further comprising:
a spring-loaded clip extending from an outer circumferential surface of the housing; and
a receptacle configured to receive the housing, wherein the receptacle defines a clip groove configured to receive the spring-loaded clip.

7. A ball panel, comprising:
a plurality of roller balls; and
a caster roller assembly located in an opening defined by the ball panel, the caster roller assembly comprising:
a base;
a roller rotationally coupled to the base; and
a thrust bearing assembly located between the base and a floor of the opening defined by the ball panel, the thrust bearing assembly including:
a bearing cup;
a plurality of thrust rollers located in a channel defined by the bearing cup; and
a top plate located between the plurality of thrust rollers and the base, wherein an inner circumferential surface of the top plate defines an opening configured to receive a protrusion extending from an underside surface of the base, wherein an outer diameter of the top plate is less than an outer diameter of the bearing cup.

8. The ball panel of claim 7, wherein a plate protrusion extending from the top plate is located in the channel defined by the bearing cup.

9. The ball panel of claim 8, wherein an axis of rotation of each thrust roller of the plurality of thrust rollers is oriented at a non-parallel angle relative to an axis of rotation of the roller.

10. The ball panel of claim 8, wherein the plurality of thrust rollers includes a plurality of vertical thrust rollers and a plurality of horizontal thrust rollers, and wherein an axis of rotation of each vertical thrust roller of the plurality of vertical thrust rollers is perpendicular to an axis of rotation of the roller, and wherein an axis of rotation of each horizontal thrust roller of the plurality of horizontal thrust rollers is parallel to the axis of rotation of the roller.

11. The ball panel of claim 7, wherein the caster roller assembly further comprises:
a housing configured to receive the thrust bearing assembly and the base;
a circlip located within a groove defined by the housing; and
a spring-loaded clip extending from an outer circumferential surface of the housing.

12. The ball panel of claim 11, further comprising a receptacle located within the opening defined by the ball panel, wherein the receptacle is located between the outer circumferential surface of the housing and a sidewall of the opening defined by the ball panel.

13. The ball panel of claim 12, wherein the receptacle defines a clip groove configured to receive the spring-loaded clip.

14. The ball panel of claim 13, wherein the receptacle includes a clip-flange configured to secure the receptacle to the ball panel.

15. A cargo handling system comprising:
a ball panel; and
a caster roller assembly coupled to the ball panel, the caster roller assembly comprising:
a base;
a roller rotationally coupled to the base; and
a thrust bearing assembly adjacent to an underside surface of the base, the thrust bearing assembly including a top plate, a plurality of thrust rollers, and a bearing cup, wherein an outer diameter of the top plate is less than an outer diameter of the bearing cup.

16. The cargo handling system of claim 15, wherein a protrusion extending from the underside surface of the base contacts an inner circumferential surface of the top plate.

17. The cargo handling system of claim 16, wherein an axis of rotation of each thrust roller of the plurality of thrust rollers is oriented at a non-parallel angle relative to an axis of rotation of the roller.

18. A caster roller assembly, comprising:
a base;
a roller rotationally coupled to the base;
a thrust bearing assembly adjacent to an underside surface of the base; and
a housing configured to receive the thrust bearing assembly and the base,
wherein the thrust bearing assembly includes:
a bearing cup;
a plurality of thrust rollers located in a channel defined by the bearing cup; and
a top plate located between the plurality of thrust rollers and the base, wherein an inner circumferential surface of the top plate defines an opening configured to receive a protrusion extending from the underside surface of the base.

19. The caster roller assembly of claim 18, wherein the plurality of thrust rollers includes a plurality of vertical thrust rollers and a plurality of horizontal thrust rollers, and wherein an axis of rotation of each vertical thrust roller of the plurality of vertical thrust rollers is perpendicular to an axis of rotation of the roller, and wherein an axis of rotation of each horizontal thrust roller of the plurality of horizontal thrust rollers is parallel to the axis of rotation of the roller.

20. The caster roller assembly of claim 18, wherein an axis of rotation of each thrust roller of the plurality of thrust rollers is oriented at an angle of between 10° and 80° relative to an axis of rotation of the roller.

* * * * *